(12) United States Patent
Chiang

(10) Patent No.: US 9,293,911 B2
(45) Date of Patent: Mar. 22, 2016

(54) PROTECTION CIRCUIT AND ELECTRONIC DEVICE USING THE SAME

(71) Applicant: ScienBiziP Consulting (Shen Zhen) Co., Ltd., Shenzhen (CN)

(72) Inventor: Cheng-Lung Chiang, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 420 days.

(21) Appl. No.: 13/873,240

(22) Filed: Apr. 30, 2013

(65) Prior Publication Data

US 2014/0254048 A1  Sep. 11, 2014

(30) Foreign Application Priority Data

Mar. 5, 2013  (CN) .................................. 102107567

(51) Int. Cl.
*H02H 9/02* (2006.01)
*H02H 7/12* (2006.01)
*H02H 9/00* (2006.01)

(52) U.S. Cl.
CPC  *H02H 9/001* (2013.01); *H02H 7/12* (2013.01)

(58) Field of Classification Search
USPC .................................................. 361/18, 20, 23
See application file for complete search history.

(56) References Cited

U.S. PATENT DOCUMENTS

| | | | | |
|---|---|---|---|---|
| 4,825,330 A * | 4/1989 | Walchle | .................... | H02H 3/04 361/101 |
| 5,235,326 A * | 8/1993 | Beigel | .................... | G01V 15/00 340/10.34 |
| 6,084,446 A * | 7/2000 | Chen | ................. | H03K 3/356008 327/143 |
| 6,085,342 A * | 7/2000 | Marholev | ............ | G06F 11/1441 327/143 |
| 7,151,656 B2 * | 12/2006 | Dvorak | ................. | H02H 1/0015 361/63 |
| 7,167,375 B2 * | 1/2007 | Goudarzi | ............... | H05K 3/341 174/257 |
| 7,772,721 B2 * | 8/2010 | Michalak | ................ | H02J 9/005 307/109 |
| 8,076,896 B2 * | 12/2011 | Yamamoto | ........ | H02M 7/53875 318/400.07 |
| 8,363,371 B2 * | 1/2013 | Korrek | ......................... | 361/93.1 |
| 8,872,555 B2 * | 10/2014 | Chen | .................... | H03K 17/223 327/143 |
| 2008/0238370 A1 * | 10/2008 | Carrier | ................ | H01M 2/1022 320/134 |

* cited by examiner

*Primary Examiner* — Thienvu Tran
*Assistant Examiner* — Angela Brooks
(74) *Attorney, Agent, or Firm* — Novak Druce Connolly Bove + Quigg LLP

(57) ABSTRACT

An exemplary protection circuit is provided to provide a controlled, latency-free, steady voltage. The circuit includes a switch module, an induction, a response module, a protection chip, and a sequence controller. The protection chip turns on the switch module when the voltage provided by a capacitor is less than a threshold voltage, thus the connection between the power supply device and the conversion circuit is enabled. The protection chip further outputs a high level signal to the sequence controller upon receiving an induction signal from the induction module. The sequence controller outputs a low level signal to the response module upon receiving the high level signal, to turn off a connection between the first end of the capacitor and ground, otherwise, a high signal is output to turn on the connection between the first end of the capacitor and ground.

15 Claims, 3 Drawing Sheets

PROTECTION CIRCUIT AND ELECTRONIC DEVICE USING THE SAME

BACKGROUND

1. Technical Field

The present disclosure relates to electronic circuits and, particularly, to a protection circuit and an electronic device having the same.

2. Description of Related Art

A protection circuit is often connected between a power supply device and a conversion circuit to prevent the conversion circuit from suffering overvoltage or overcurrent. A capacitor is arranged between the power supply device and the protection circuit and is grounded, to steady the voltage. The protection circuit includes a protection chip to compare a voltage Vin provided by the capacitor with a threshold voltage POR. The protection chip resets when the voltage Vin is less than the threshold voltage POR. Thus, the conversion circuit can output a normal voltage Vout. However, the capacitor does not discharge instantaneously, and in some situations, the capacitor is not discharged completely when the power supply device restarts to supply power, thus the voltage Vin provided by the capacitor is greater than the threshold voltage POR, and the protection chip does not reset, accordingly, the voltage Vout outputted by the conversion circuit is zero. Therefore, a protection circuit is needed to solve the above problem.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Embodiments of the present disclosure are described with reference to the accompanying drawings.

Figure 1:
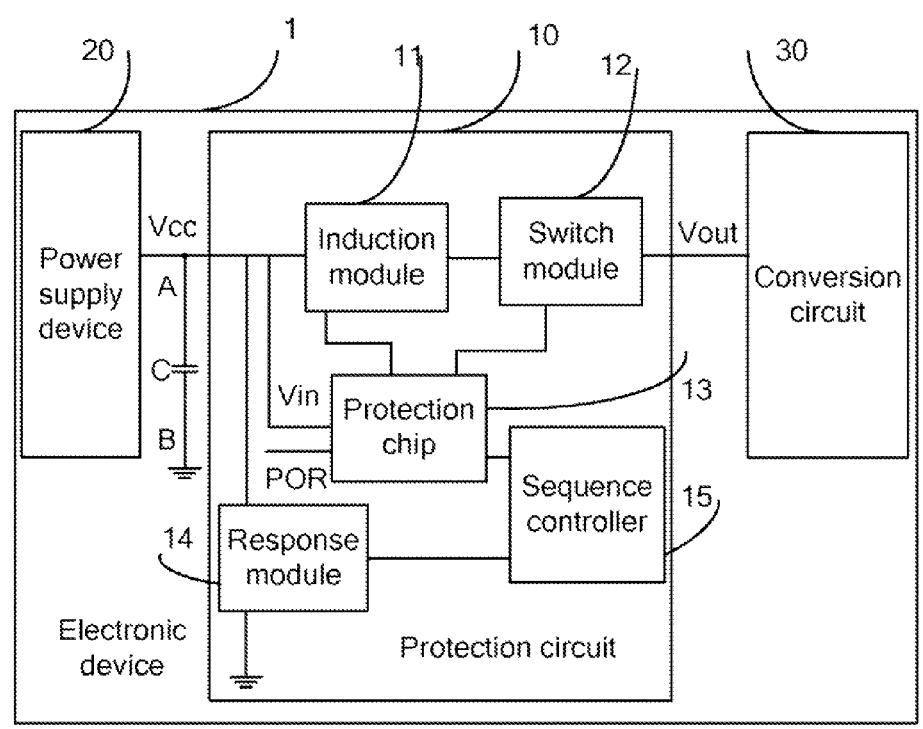
FIG. 1 is a block diagram of an electronic device, in accordance with an exemplary embodiment.

FIG. 1 shows a block diagram of an electronic device 1. The electronic device 1 includes a protection circuit 10, a power supply device 20, and a conversion circuit 30. The protection circuit 10 includes an induction module 11, a switch module 12, a protection chip 13, a response module 14, and a sequence controller 15. The induction module 11 and the switch module 12 are connected between the power supply device 20 and the conversion circuit 30. The power supply device 20 outputs a voltage Vcc. The induction module 11 is adjacent to the power supply device 20 and the switch module 12 is adjacent to the conversion circuit 30, and vise versa. The induction module 11 outputs an induction signal when a current drawn by the induction module 11 is greater than zero and does not output an induction signal when the current drawn by the induction module 11 is zero. The switch module 12 controls a connection between the power supply device 20 and the conversion circuit 30. When the switch module 12 is turned on, the connection between the power supply device 20 and the conversion circuit 30 is enabled, allowing the conversion circuit 30 to receive power from the power supply device 20. When the switch module 12 is turned off, the connection between the power supply device 20 and the conversion circuit 30 is disabled, the conversion circuit 30 cannot receive power from the power supply device 20.

The electronic device 1 further includes a capacitor C. A first end A of the capacitor C is connected between the power supply device 20 and the protection circuit 10. A second end B of the capacitor C is grounded. The capacitor C steadies the voltage Vcc outputted by the power supply device 20 to prevent spikes and dips and keep the voltage Vcc smooth, and outputs a voltage Vin. When the electronic device 1 is shut down, the power supply device 20 stops outputting a voltage Vcc, accordingly the capacitor C discharges, and the voltage Vin gradually decreases to zero. When the electronic device 1 is on, the power supply device 20 outputs the voltage Vcc to charge the capacitor C, accordingly the voltage Vin gradually increases until the voltage Vin reaches a steady voltage.

The protection chip 13 is connected between the first end A of the capacitor

C and the switch module 12. The protection chip 13 compares the voltage Vin provided by the capacitor C with a threshold voltage POR when the electronic device 1 is on. The protection chip 13 outputs a turn-on signal to turn on the switch module 12 when the voltage Vin is less than the threshold voltage POR. The protection chip 13 is further configured to output a turn-off signal to turn off the switch module 12 when the voltage Vin is equal to or greater than the threshold voltage POR. In the embodiment, the voltage Vin is less than the threshold voltage POR after the capacitor C has discharged over a preset time interval.

The protection chip 13 is further connected to the induction module 11. The protection chip 13 outputs a high level signal to the sequence controller 15 when receiving the induction signal outputted by the induction module 11, and outputs a low level signal to the sequence controller 15 when not receiving the induction signal.

The response module 14 is connected between the first end A of the capacitor C and ground. The response module 14 controls a connection between the first end A of the capacitor C and ground.

The sequence controller 15 is connected between the protection chip 13 and the response module 14. The sequence controller 15 outputs a low level signal to the response module 14 upon receiving a high level signal from the protection chip 13, to control the response module 14 to turn off the connection between the first end A of the capacitor C and ground. The sequence controller 15 further outputs a high level signal to the response module 14 upon receiving a low level signal from the protection chip 13, to control the response module 14 to turn on the connection between the first end A of the capacitor C and ground.

When the electronic device 1 is shut down, the power supply device 20 stops outputting voltage Vcc, thus the current drawn by the induction module 11 is zero, and the induction module 11 does not output an induction signal. Thus, the protection chip 13 does not receive an induction signal, the protection chip 13 outputs a low level signal to the sequence controller 15. The sequence controller 15 outputs a high level signal to the response module 14 according to the low level signal outputted by the protection chip 13. The response module 14 turns on the connection between the first end A of the capacitor C and ground in response to the high level signal, thus the capacitor C discharges completely as quickly as possible, and the voltage Vin provided by the capacitor C is less than the threshold voltage POR when the electronic device 1 is turned on.

When the electronic device 1 is on and the voltage Vin provided by the capacitor C is less than the threshold voltage POR, the protection chip 13 outputs the turn-on signal to turn on the switch module 12, thus the connection between the power supply device 20 and the conversion circuit 30 is enabled. The current drawn by the induction module 11 is greater than zero, thus the induction module 11 outputs the induction signal. The protection chip 13 receives the induction signal outputted by the induction module 11, the protection chip 13 outputs a high level signal to the sequence controller 15, and the sequence controller 15 accordingly outputs a low level signal to the response module 14, to turn off the connection between the first end A of the capacitor C and ground. Thus, the power supply device 20 outputs a steady voltage Vout to the conversion circuit 30 through the switch module 12.

In the embodiment, the turn-on signal is a low level signal and the turn-off signal is a high level signal.

Figure 2:
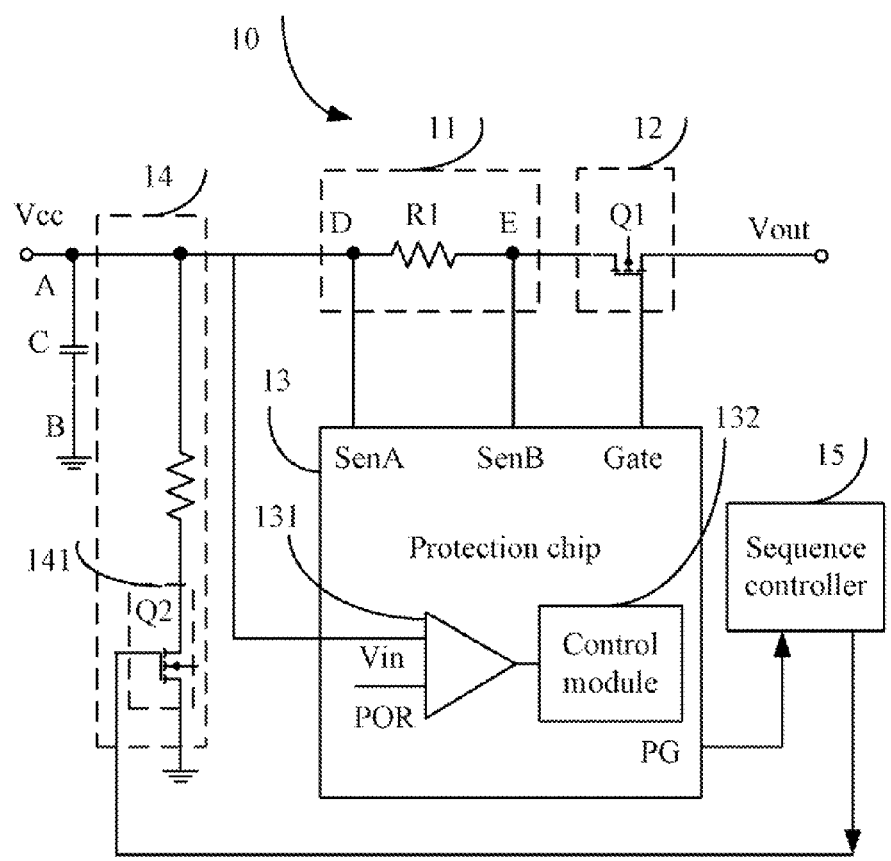
FIG. 2 is a circuit diagram of a protection circuit of the electronic device of FIG. 1, in accordance with an exemplary embodiment.
Figure 3:
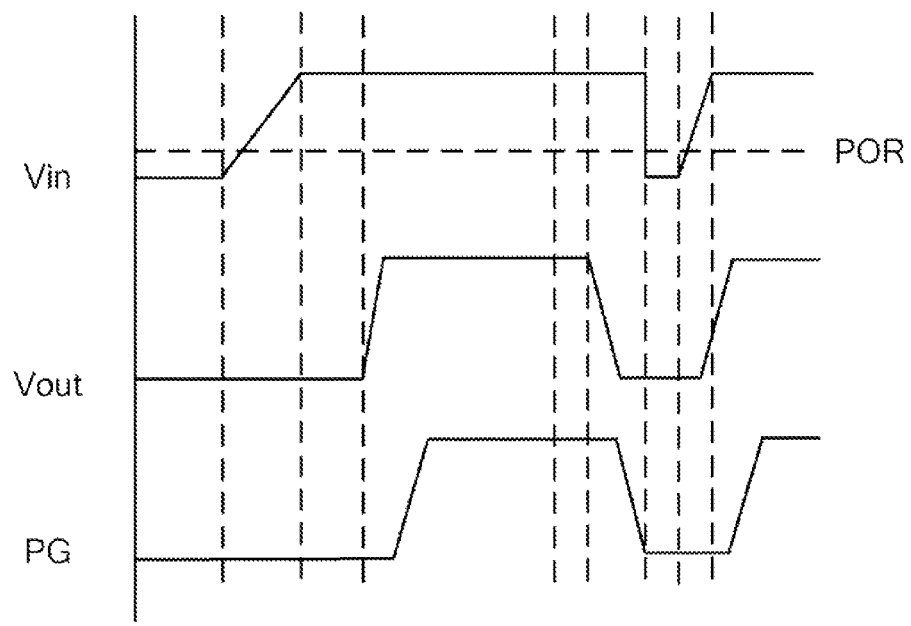
FIG. 3 is a sequence circuit diagram of the protection circuit of FIG. 2.

Referring to FIGS. 2-3, the induction module 11 includes a resistor R1. In the embodiment, a first end D of the resistor R1 is connected to a connection point between the power supply device 20 and the first end A of the capacitor C, a second end E of the resistor R1 is connected to the switch module 12. In another embodiment, the first end D is connected to the switch module 12, and the second end E is connected to the conversion circuit 30. When a current drawn by the resistor R1 is greater than zero, a voltage across the resistor R1 is greater than zero. In the embodiment, the voltage is the induction signal.

The switch module 12 includes a low voltage activated switch 121. In the embodiment, the low voltage activated switch 121 is a p-channel metal-oxide-semiconductor field-effect transistor (PMOSFET) Q1. A source of the PMOSFET Q1 is connected to the second end E of the resistor R1, a drain of the PMOSFET Q1 is connected to the conversion circuit 30, and a gate of the PMOSFET Q1 is connected to the protection chip 13.

The protection chip 13 includes a gate output terminal Gate, a comparator 131, a control module 132, a first sense terminal SenA, a second sense terminal SenB, and a power good terminal PG. The gate output terminal Gate is connected to the gate of the PMOSFET Q1. The comparator 131 compares the voltage Vin provided by the capacitor C with the threshold voltage POR when the electronic device 1 is on. When the voltage Vin is less than the threshold voltage POR, the control module 132 controls the gate output terminal Gate to output a low level signal to turn on the switch module 12. When the voltage Vin is greater than the threshold voltage POR, the control module 132 controls the gate output terminal Gate to output a high level signal to turn off the switch module 12. The first sense terminal SenA and the second sense terminal SenB are respectively connected to the first end D of the resistor R1 and the second end E of the resistor R1. The first sense terminal SenA and the second sense terminal SenB detect the voltage across the resistor R1. The first sense terminal SenA and the second sense terminal SenB can detect that the voltage across the resistor R1 is greater than zero, namely, that the protection chip 13 is receiving the induction signal. When the first sense terminal SenA and the second sense terminal SenB detect that the voltage across the resistor R1 is zero, the protection chip 13 does not receive any induction signal.

The power good terminal PG is connected to the sequence controller 15. When the protection chip 13 receives the induction signal, the protection chip 13 controls the power good terminal PG to output the high level signal to the sequence controller 15. When protection chip 13 does not receive the induction signal, the protection chip 13 controls the power good terminal PG to output the low level signal to the sequence controller 15.

The response module 14 includes a high voltage activated switch 141. In the embodiment, the high voltage activated switch 141 is an n-channel metal-oxide-semiconductor field-effect transistor (NMOSFET) Q2. A source of the NMOSFET Q2 is connected between the first end A of the capacitor C and the protection chip 13, a drain of the NMOSFET Q2 is grounded, and a gate of the NMOSFET Q2 is connected to the sequence controller 15.

When the electronic device 1 is shut down, the first sense terminal SenA and the second sense terminal SenB detect that the voltage across the resistor R1 is zero, namely, the protection chip 13 does not receive any induction signal, thus the protection chip 13 controls the power good terminal PG to output the low level signal to the sequence controller 15. The sequence controller 15 outputs the high level signal to the gate of the NMOSFET Q2 in response to the low level signal outputted by the power good terminal PG. Thus, the gate voltage of the NMOSFET Q2 is greater than the source voltage of the NMOSFET Q2, and the NMOSFET Q2 is accordingly turned on. The first end A of the capacitor C is grounded through the turning on of the NMOSFET Q2, thus the discharge speed of the capacitor C is increased, and the capacitor C discharges very fast, which causes the voltage Vin provided by the capacitor C to quickly decrease to zero.

When the electronic device 1 is on and the voltage Vin provided by the capacitor C is less than the threshold voltage POR, the control module 132 controls the gate output terminal Gate to output the low level signal to the gate of the PMOSFET Q1, thus the gate voltage of the PMOSFET Q1 is less than the source voltage of the PMOSFET Q1, and the PMOSFET Q1 is accordingly turned on. The conversion circuit 30 is connected to the power supply device 20 through the turning on of the PMOSFET Q1 and the resistor R1. Thus, the first sense terminal SenA and the second sense terminal SenB detect that the voltage across the resistor R1 is greater than zero, namely, the protection chip 13 is receiving the induction signal, the protection chip 13 controls the power good terminal PG to output the high level signal to the sequence controller 15. The sequence controller 15 outputs the low level signal to the gate of the NMOSFET Q2 in response to the high level signal outputted by the power good terminal PG. Thus, the gate voltage of the NMOSFET Q2 is equal to the source voltage of the NMOSFET Q2, and the NMOSFET Q2 is according turned off. The capacitor C continuously stabilises and steadies the voltage Vcc outputted by the power supply device 20, thus the power supply device 20 outputs a steady voltage Vout to the conversion circuit 30 through the turning on of the PMOSFET Q1.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:
1. A protection circuit applied in an electronic device, comprising:
   a switch module configured to control a connection between a power supply device of the electronic device and a conversion circuit of the electronic device;

an induction module configured to output an induction signal when a current drawn by the induction module is greater than zero, and cease outputting the induction signal when the current drawn by the induction module is zero;

a response module connected to ground, the response module being configured to control a connection between a capacitor of the electronic device and ground;

a protection chip connected to the switch module, the protection chip being configured to compare the voltage provided by the capacitor with a threshold voltage when the electronic device is on, output a turn-on signal to turn on the switch module when the voltage provided by the capacitor is less than the threshold voltage, and output a turn-off signal to turn off the switch module when the voltage provided by the capacitor is equal to or greater than the threshold voltage; the protection chip being further connected to the induction module, the protection chip being configured to output a high level signal upon receiving the induction signal outputted by the induction module, and output a low level signal upon not receiving the induction signal; and a sequence controller connected between the protection chip and the response module, the sequence controller being configured to output a low level signal to the response module upon receiving the high level signal outputted by the protection chip, and output a high level signal to the response module upon receiving the low level signal outputted by the protection chip;

wherein when the switch module is turned on, the connection between the power supply device and the conversion circuit is enabled, and when the switch module is turned off, the connection between the power supply device and the conversion circuit is disabled; and when the response module receives the low level signal from the sequence controller, the response module turns off the connection between the first end of the capacitor and ground, and when the response module receives the high level signal from the sequence controller, the response module turns on the connection between the first end of the capacitor and ground.

2. The protection circuit as described in claim 1, wherein the induction module comprises a resistor, the resistor outputs the induction signal when the connection between the power supply device and the conversion circuit is enabled, and ceases outputting the induction signal when the connection between the power supply device and the conversion circuit is disabled.

3. The protection circuit as described in claim 1, wherein the switch module comprises a low voltage activated switch, a first terminal of the low voltage activated switch is connected to the induction module, a second terminal of the low voltage activated switch is connected to the protection chip, and a third terminal of the low voltage activated switch is configured to output voltage to the conversion circuit when the second terminal voltage of the low voltage activated switch is less than the first terminal voltage of the low voltage activated switch.

4. The protection circuit as described in claim 3, wherein the low voltage activated switch is a p-channel metal-oxide-semiconductor field-effect transistor (PMOSFET), a source of the PMOSFET is connected to the induction module, a gate of the PMOSFET is connected to the protection chip, and a drain of the PMOSFET is configured to output voltage to the conversion circuit when the gate voltage of the PMOSFET is less than the source voltage of the PMOSFET.

5. The protection circuit as described in claim 1, wherein the protection chip comprises a gate output terminal, a comparator, a control module, a first sense terminal, a second sense terminal, and a power good terminal; the gate output terminal is connected to the switch module; the comparator is configured to compare the voltage provided by the capacitor with the threshold voltage when the electronic device is starting; the control module is configured to control the gate output terminal to output a low level signal to turn on the switch module when the voltage provided by the capacitor is less than the threshold voltage, and control the gate output terminal to output a high level signal to turn off the switch module when the voltage provided by the capacitor is equal to or greater than the threshold voltage; the first sense terminal and the second sense terminal are respectively connected to two opposite ends of the induction module to detect the voltage across the induction module, the first sense terminal and the second sense terminal detect that the voltage across the induction module is greater than zero, namely, the protection chip receives the induction signal, and the first sense terminal and the second sense terminal detect that the voltage across the induction module is zero, namely, the protection chip does not receive any induction signal; the power good terminal is connected to the sequence controller; the protection chip controls the power good terminal to output the high level signal to the sequence controller upon receiving the induction signal, and controls the power good terminal to output the low level signal to the sequence controller upon not receiving the induction signal.

6. The protection circuit as described in claim 1, wherein the response module comprises a high voltage activated switch, a first terminal of the high voltage activated switch is configured to receive the voltage provided by the capacitor, a second terminal of the high voltage activated switch is grounded, and a third terminal of the high voltage activated switch is connected to the sequence controller.

7. The protection circuit as described in claim 6, wherein the high voltage activated switch is a n-channel metal-oxide-semiconductor field-effect transistor (NMOSFET), a source of the NMOSFET is configured to receive the voltage provided by the capacitor, a drain of the NMOSFET is grounded, and a gate of the NMOSFET is connected to the sequence controller.

8. An electronic device, comprising:
a power supply device;
a conversion circuit;
a capacitor configured to prevent a voltage outputted by the power supply device from abating, a first end of the capacitor being connected between the power supply device and the converting circuit, and a second end of the capacitor being grounded; and
a protection circuit comprising:
a switch module configured to control a connection between the power supply device and the conversion circuit;
an induction module, the induction module and the switch module being connected between the power supply device and the conversion circuit, the induction module being configured to output an induction signal when a current drawn by the induction module is greater than zero, and cease outputting the induction signal when the current drawn by the induction module is zero;
a response module connected between the first end of the capacitor and ground, the response module being configured to control a connection between the capacitor and ground;

a protection chip connected between the first end of the capacitor and the switch module, the protection chip being configured to compare the voltage provided by the capacitor with a threshold voltage when the electronic device is on, output a turn-on signal to turn on the switch module when the voltage provided by the capacitor is less than the threshold voltage, and output a turn-off signal to turn off the switch module when the voltage provided by the capacitor is equal to or greater than the threshold voltage; the protection chip being further connected to the induction module, the protection chip being configured to output a high level signal upon receiving the induction signal outputted by the induction module and output a low level signal upon not receiving the induction signal; and a sequence controller connected between the protection chip and the response module, the sequence controller being configured to output a low level signal to the response module upon receiving the high level signal outputted by the protection chip, and output a high level signal to the response module upon receiving the low level signal outputted by the protection chip;

wherein when the switch module is turned on, the connection between the power supply device and the conversion circuit is enabled, and when the switch module is turned off, the connection between the power supply device and the conversion circuit is disabled; and when the response module receives the low level signal from the sequence controller, the response module turns off the connection between the first end of the capacitor and ground, and when the response module receives the high level signal from the sequence controller, the response module turns on the connection between the first end of the capacitor and ground.

9. The electronic device as described in claim 8, wherein the induction module comprises a resistor, a first end of the resistor is connected to the switch module and a second end of the resistor is connected to the conversion module.

10. The electronic device as described in claim 8, wherein the induction module comprises a resistor, a first end of the resistor is connected to a connection point between the power supply device and the first end of the capacitor, and a second end of the resistor is connected to the switch module.

11. The electronic device as described in claim 8, wherein the switch module comprises a low voltage activated switch, a first terminal of the low voltage activated switch is connected to the induction module, a second terminal of the low voltage activated switch is connected to the conversion circuit, and a third terminal of the low voltage activated switch is connected to the protection chip.

12. The electronic device as described in claim 11, wherein the low voltage activated switch is a p-channel metal-oxide-semiconductor field-effect transistor (PMOSFET), a source of the PMOSFET is connected to the induction module, a drain of the PMOSFET is connected to the conversion circuit, and a gate of the PMOSFET is connected to the protection chip.

13. The electronic device as described in claim 8, wherein the protection chip comprises a gate output terminal, a comparator, a control module, a first sense terminal, a second sense terminal, and a power good terminal; the gate output terminal is connected to the switch module; the comparator is configured to compare the voltage provided by the capacitor with the threshold voltage when the electronic device is starting; the control module is configured to control the gate output terminal to output a low level signal to turn on the switch module when the voltage provided by the capacitor is less than the threshold voltage, and control the gate output terminal to output a high level signal to turn off the switch module when the voltage provided by the capacitor is equal to or greater than the threshold voltage; the first sense terminal and the second sense terminal are respectively connected to two opposite ends of the induction module to detect the voltage across the induction module, the first sense terminal and the second sense terminal detect that the voltage across the induction module is greater than zero, namely, the protection chip receives the induction signal, and the first sense terminal and the second sense terminal detect that the voltage across the induction module is zero, namely, the protection chip does not receive the induction signal; the power good terminal is connected to the sequence controller; the protection chip controls the power good terminal to output the high level signal to the sequence controller upon receiving the induction signal, and controls the power good terminal to output the low level signal to the sequence controller upon not receiving the induction signal.

14. The electronic device as described in claim 8, wherein the response module comprises a high voltage activated switch, a first terminal of the high voltage activated switch is connected between the first end of the capacitor and the protection chip, a second terminal of the high voltage activated switch is grounded, and a third terminal of the high voltage activated switch is connected to the sequence controller.

15. The electronic device as described in claim 14, wherein the high voltage activated switch is a n-channel metal-oxide-semiconductor field-effect transistor (NMOSFET), a source of the NMOSFET is connected between the first end of the capacitor and the protection chip, a drain of the NMOSFET is grounded, and a gate of the NMOSFET is connected to the sequence controller.

* * * * *